United States Patent
Basu et al.

(10) Patent No.: US 11,785,079 B2
(45) Date of Patent: Oct. 10, 2023

(54) FREE STORAGE PROTOCOL FOR BLOCKCHAIN PLATFORM

(71) Applicant: 0Chain Corp., Cupertino, CA (US)

(72) Inventors: Saswata Basu, Cupertino, CA (US); Thomas Howard Austin, San Jose, CA (US)

(73) Assignee: 0CHAIN CORP., Cupertino, CA (US)

( * ) Notice: Subject to any disclaimer, the term of this patent is extended or adjusted under 35 U.S.C. 154(b) by 365 days.

(21) Appl. No.: 17/349,748

(22) Filed: Jun. 16, 2021

(65) Prior Publication Data
US 2021/0320972 A1    Oct. 14, 2021

(51) Int. Cl.
| | |
|---|---|
| *H04L 29/06* | (2006.01) |
| *H04L 67/104* | (2022.01) |
| *G06Q 20/06* | (2012.01) |
| *H04L 9/06* | (2006.01) |
| *H04L 9/08* | (2006.01) |
| *H04L 9/32* | (2006.01) |
| *G06Q 20/22* | (2012.01) |
| *H04L 9/40* | (2022.01) |
| *H04L 9/00* | (2022.01) |

(52) U.S. Cl.
CPC ......... *H04L 67/1059* (2013.01); *G06Q 20/06* (2013.01); *G06Q 20/0658* (2013.01); *G06Q 20/223* (2013.01); *H04L 9/0637* (2013.01); *H04L 9/0643* (2013.01); *H04L 9/0841* (2013.01); *H04L 9/0894* (2013.01); *H04L 9/3236* (2013.01); *H04L 9/3297* (2013.01); *H04L 63/1466* (2013.01); *H04L 9/50* (2022.05); *H04L 2209/56* (2013.01)

(58) Field of Classification Search
CPC . H04L 67/1059; H04L 9/0637; H04L 9/0643; H04L 9/0841; H04L 9/0894; H04L 9/3236; H04L 9/3297; H04L 63/1466; H04L 9/50; H04L 2209/56; H04L 63/10; G06Q 20/06; G06Q 20/0658; G06Q 20/223
See application file for complete search history.

(56) References Cited

U.S. PATENT DOCUMENTS

| | | | |
|---|---|---|---|
| 10,986,177 B2* | 4/2021 | Basu | H04L 9/0894 |
| 11,171,791 B2* | 11/2021 | Basu | H04L 9/085 |
| 11,379,832 B2* | 7/2022 | Austin | G06Q 20/3821 |
| 11,586,765 B2* | 2/2023 | Basu | G06Q 20/223 |
| 11,593,321 B2* | 2/2023 | Basu | G06F 16/21 |
| 2019/0044734 A1* | 2/2019 | Lancashire | H04L 9/3247 |
| 2019/0124146 A1* | 4/2019 | Austin | G06Q 20/223 |
| 2020/0258605 A1* | 8/2020 | Blechman | G16H 40/67 |
| 2021/0073805 A1* | 3/2021 | Sarkissian | G06F 21/64 |
| 2021/0217002 A1* | 7/2021 | Basu | H04L 9/0841 |
| 2023/0004423 A1* | 1/2023 | Fatahi | G06F 21/64 |

\* cited by examiner

*Primary Examiner* — Mahfuzur Rahman
(74) *Attorney, Agent, or Firm* — Levine's Tech Consulting LLC; Frank E. Levine

(57) ABSTRACT

An approach is disclosed for providing free storage to a client on a blockchain platform. A number of free storage markers targeted for the client is generated by a governing entity. After validating the client by the governing entity, the number of free storage markers are transferred to the client where the free storage markers include a timestamp, a number of tokens, a client identification, an expiration, and a governing entity signature. An allocation from the number of free storage markers received from the client is processed by the governing entity for storage access.

20 Claims, 11 Drawing Sheets

FREE STORAGE PROTOCOL FOR BLOCKCHAIN PLATFORM

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a utility application related to and claims the benefit of priority from U.S. Provisional Patent Application No. 62/707,177 filed on Oct. 24, 2017.

If an Application Data Sheet (ADS) has been filed for this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BACKGROUND

The present invention relates to a computing environment, and more particularly to provide on-line free storage to clients in a blockchain platform.

SUMMARY

According to one embodiment of the invention, there is a method that includes a processor and a local storage device accessible by the processor of providing free storage to a client on a blockchain platform. A number of free storage markers targeted for the client is generated by the governing entity. After validating the client by the governing entity, the number of free storage markers are transferred to the client where the free storage markers include a timestamp, a number of tokens, a client identification, an expiration, and a governing entity signature. An allocation from the number of free storage markers received from the client is processed by the governing entity for storage access.

According to one embodiment of the invention, there is provided an information handling system including at least one processor executing instructions implementing steps of the method that provides free storage to a client on a blockchain platform.

According to one embodiment of the invention, there is provided a computing program product executing instructions having the steps of the method that provides free storage to a client on a blockchain platform.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
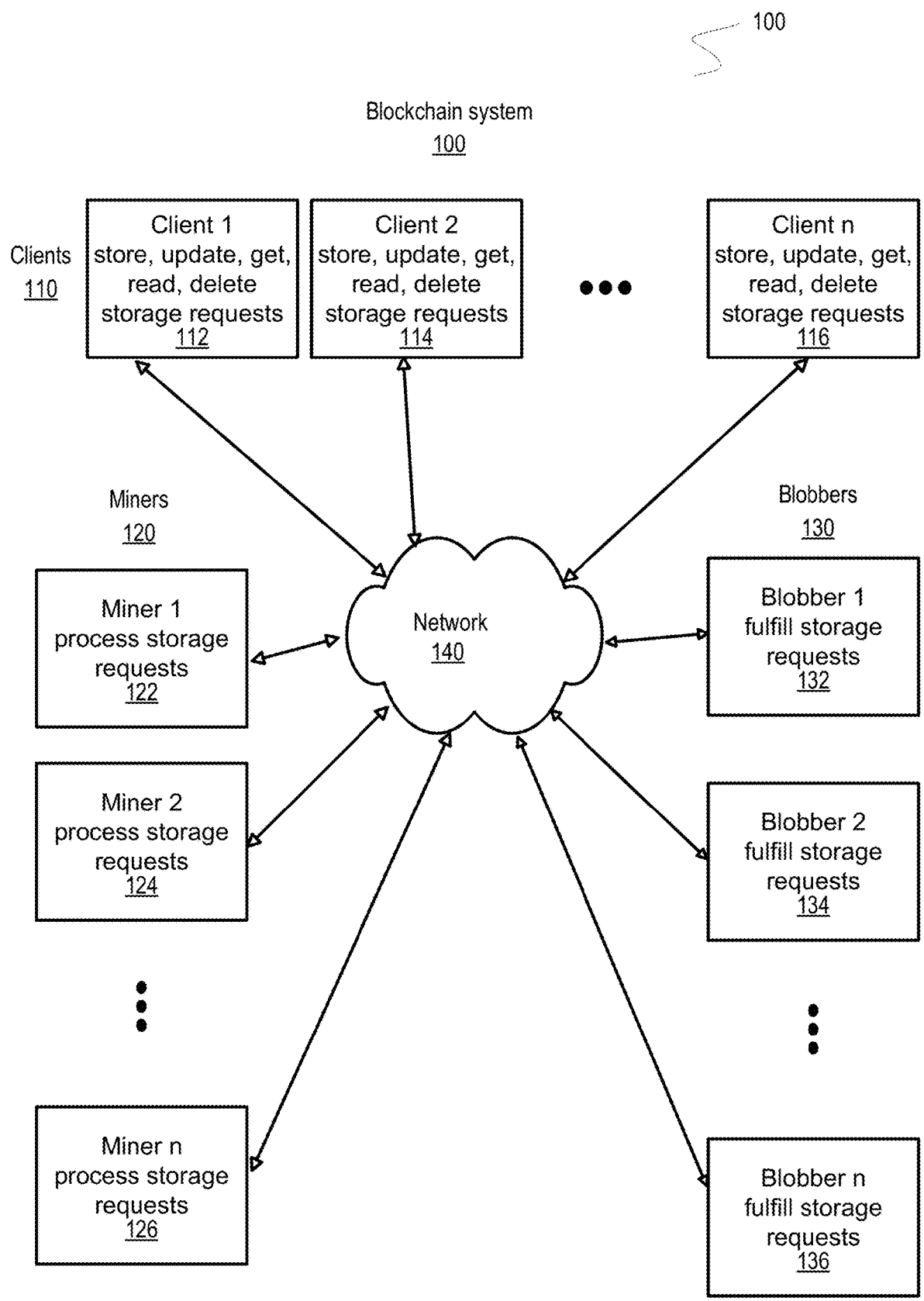
FIG. 1 illustrates an embodiment of a blockchain system according to the present disclosure.

Blockchain technology, sometimes also referred to as "blockchain," is a particular type of distributed database. Blockchains can theoretically be used to store any type of data or content, but are particularly well-suited to environments in which transparency, anonymity, and verifiability are important considerations. Examples include financial projects, such as cryptocurrencies, auctions, capital management, barter economies, insurance lotteries, and equity crowd sourcing.

A blockchain, originally block chain, is a growing list of records, called blocks, that are linked using cryptography. Each block contains a cryptographic hash of the previous block, a timestamp, and transaction data (generally represented as a Merkle tree). The Merkle tree is a hash-based data structure that is a generalization of the hash list. It is a tree structure in which each leaf node is a hash of a block of data, and each non-leaf node is a hash of its children. Typically, Merkle trees have a branching factor of 2, meaning that each node has up to 2 children.

The term "ledger" means the append-only records stored in a blockchain. The records are immutable and may hold any type of information, including financial records and software instructions.

The term "blockchain" means a distributed database system comprising a continuously growing list of ordered records ("blocks") shared across a network. In a typical embodiment, the blockchain functions as a shared transaction ledger.

The term "transaction" means an asset transfer onto or off of the ledger represented by the blockchain, or a logically equivalent addition to or deletion from the ledger.

The term "blockchain network" means the collection of nodes interacting via a particular blockchain protocol and rule set.

The term "nonce" means an arbitrary number or other data used once and only once in a cryptographic operation. A nonce is often, but not necessarily, a random or pseudo-random number. In some embodiments, a nonce will be chosen to be an incrementing number or time stamp which is used to prevent replay attacks.

The term "block" means a record in a continuously growing list of ordered records that comprise a blockchain. In an embodiment, a block comprises a collection of confirmed and validated transactions, plus a nonce.

By design, a blockchain is resistant to modification of its data. This is because once recorded, the data in any given block cannot be altered retroactively without alteration of all subsequent blocks. For use as a distributed ledger, a blockchain is typically managed by a peer-to-peer network collectively adhering to a protocol for inter-node communication and validating new blocks. Although blockchain records are not unalterable, blockchains may be considered secure by design and exemplify a distributed computing system with high Byzantine fault tolerance. A Byzantine fault is a condition of a computer system, particularly distributed computing systems, where components may fail and there is imperfect information on whether a component has failed. The blockchain has been described as "an open, distributed ledger that can record transactions between two parties efficiently and in a verifiable and permanent way."

The technology is perhaps most easily understood through a simple and familiar example, such as "Bitcoin," a cryptocurrency. A cryptocurrency is not entirely dissimilar from conventional currencies and, like a traditional currency, is essentially a medium of exchange. Traditional currencies are represented by a physical object paper currency or minted coins, for example—which is "spent" by physically delivering it in the proper denominations to a recipient in exchange for a good or service.

However, for long-distance transactions, such as buying goods or services over the Internet, direct physical delivery is not feasible. Instead, the currency would have to be mailed to the recipient. However, this carries a very high risk of fraud. The recipient may simply keep the money and not deliver the purchased good or service, leaving the buyer without recourse. Instead, on-line transactions are typically carried out using electronic payment systems in which the transaction is processed, validated, and mediated by a trusted third party. This third party may be a bank, as in the case of a debit or credit card, or a third party service functioning as an escrow agent. Crypto currencies operate on this same principle, except that instead of using a financial institution or other third party to facilitate the transaction, the transaction is verified through a consensus reached via cryptographic proof.

Internet is a global computer network providing a variety of information and communication facilities, comprising interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

The current blockchain platform and related applications known to the industry fall short in multiple ways. First, there is no separation of roles on the blockchain based on the role of an entity for a given transaction. Each transaction follows a strict chain of rules and is dependent on its preceding transaction. If one transaction fails, all subsequent transactions on the blockchain become unusable. The computing time and built in delay in any blockchain platform is dependent on the available computing resources of its nodes. In absence of a role model, a single node has several computing intense tasks that are slow to execute. A slow system becomes vulnerable and becomes open to attacks. The current solutions do not allow for client flexibility in developing distributed applications with immutability and finality of transactions on a blockchain platform.

In order to overcome the deficiencies of the prior art, various methodologies are disclosed where an infrastructure is supplied to enable usage of the disclosed methodology. In an embodiment, application programming interfaces (API) are provided to handle the details where examples are available on the first blockchain platform. For this disclosure, high level descriptions of the details are discussed which should be adequate for those with ordinary skill in the art to implement solutions. In this disclosure, support for the identified features may be identified as modules in the blockchain platform with embodiments as described herein embedded in the modules. Access to functions in the modules are typically supported by documented APIs and may be available for common usage.

The following definitions generally apply to this disclosure and should be understood in both the context of client/server computing generally, as well as the environment of a blockchain network. These definitions, and other terms used herein, should also be understood in the context of leading white papers pertaining to the subject matter. These include, but are not necessarily limited to, Bitcoin: A Peer-to-Peer Electronic Cash System (Satoshi Nakamoto 2008). It will be understood by a person of ordinary skill in the art that the precise vocabulary of blockchains is not entirely settled, and although the industry has established a general shared understanding of the meaning of the terms, reasonable variations may exist.

The term "network" generally refers to a voice, data, or other telecommunications network over which computers communicate with each other. The term "server" generally refers to a computer providing a service over a network, and a "client" generally refers to a computer accessing or using a service provided by a server over a network. The terms "server" and "client" may refer to hardware, software, and/or a combination of hardware and software, depending on context. The terms "server" and "client" may refer to endpoints of a network communication or network connection, including but not necessarily limited to a network socket connection. A "server" may comprise a plurality of software and/or hardware servers delivering a service or set of services. The term "host" may, in noun form, refer to an endpoint of a network communication or network (e.g., "a remote host"), or may, in verb form, refer to a server providing a service over a network ("hosts a website"), or an access point for a service over a network. It should be noted that the term "blockchain network" as used herein usually means the collection of nodes interacting via a particular blockchain protocol and ruleset. Network nodes are the physical pieces that make up a network. They usually include any device that both receives and then communicates information. But they might receive and store the data, relay the information elsewhere, or create and send data instead.

The term "asset" means anything that can be owned or controlled to produce value.

The term "asymmetric key encryption," also known as "public key encryption," "public key cryptography," and "asymmetric cryptography," means a cryptographic system that uses pairs of mathematically related keys, one public and one private, to authenticate messages. The "private key" is kept secret by the sending of a message or document and used to encrypt the message or document. The "public key" is shared with the public and can be used to decrypt the message or document.

The term "hash" means a cryptographic algorithm to produce a unique or effectively unique value, properly known as a "digest" but sometimes informally referred to itself as a "hash," usually from an arbitrary, variable-sized input.

Hashes are repeatable and unidirectional, meaning the algorithm always produces the same digest from the same input, but the original input cannot be determined from the digest. A change to even one byte of the input generally results in a very different digest, obscuring the relationship between the original content and the digest. SHA256 (secure hash algorithm) is an example of a widely used hash.

The term "mining" means the process by which new transactions to add to the blockchain are verified by solving a cryptographic puzzle. In a proof-of-work and proof-of-stake blockchain network, mining involves collecting transactions reported to the blockchain network into a "block," adding a nonce to the block, then hashing the block. If the resulting digest complies with the verification condition for the blockchain system (i.e., difficulty), then the block is the next block in the blockchain.

The term "miner" refers to a computing system that processes transactions. Miners may process transactions by combining requests into blocks. In embodiments, a miner has a limited time, for example, 15-50 milliseconds, to produce a block. Not all miners generate blocks. Miners that generate blocks are called "generators." Miners may be ranked and chosen to perform transactions based on their ranking. Some limited number of miners may be chosen to perform validation. All miners must be registered on the blockchain.

Messages representing generated blocks are sent to all miners by identifying the block with a block hash, transaction hash, and a signature of the minor producing the block. The miners receiving the messages replay the transactions for the block and sign an authentication message. If there is enough miners authenticating the block, consensus ticket it signed. In some embodiments a ⅔+1 agreement or 67% agreement is needed to generate the consensus ticket.

The term "sharder" refers to a computing system that that keeps tracks of its blockchain history. They are a single source of truth regarding any given transaction.

The term "transaction fee" means a fee imposed on some transactions in a blockchain network. The amount of the transaction fee is awarded to the miner who successfully mines the next block containing that transaction.

The term "wallet" means a computer file or software of a user that allows a user of a blockchain network to store and spend cryptocurrency by submitting transactions to the blockchain network. A wallet is usually itself protected by cryptography via a private key.

The term "consensus" refers to a computational agreement among nodes in a blockchain network as to the content and order of blocks in the blockchain.

The term "digital signature" means a mathematically-based system for demonstrating the authenticity of a message or document by ensuring that it was sent from the identified sender and not tampered with by an intermediary. Blockchains generally use asymmetric key encryption to implement digital signatures.

The term "fork" means a split in a blockchain where two different valid successor blocks have been mined and are present in the blockchain, but consensus has not yet been reached as to which fork is correct. This type of fork is also referred to as a "soft fork," and is automatically resolved by consensus over time. A "hard fork" is the forced imposition of a fork by manual intervention to invalidate prior blocks/transactions, typically via a change to the blockchain rules and protocol.

The term "cryptocurrency" (or "crypto") is a digital currency that can be used to buy goods and services, but uses an online ledger with strong cryptography to secure online transactions. Much of the interest in these unregulated currencies is to trade for profit, with speculators at times driving prices skyward. There are currently many different types of cryptocurrencies offered by many different blockchain implementations. The usage of any given cryptocurrency may be represented herein as "tokens."

The term "genesis block" means the very first block in a blockchain, that is, the root of the Merkle tree.

The term "proof-of-stake" means a mining system in which the production and verification of a block is pseudo-randomly awarded to a candidate miner, or prioritized list of candidate miners, who have invested a valuable stake in the system which can be collected by the blockchain network if the produced block is later deemed invalid. The stake functions as a deterrent against fraudulent blocks.

The term "proof-of-work" means a mining system in which the difficulty of finding a nonce that solves the cryptographic puzzle is high enough that the existence of a block compliant with the verification rules is itself sufficient proof that the block is not fraudulent.

The term "smart contracts" means computer programs executed by a computer system that facilitate, verify, or enforce the negotiation and performance of an agreement using computer language rather than legal terminology. Smart contracts may be verified and executed on virtual computer systems distributed across a blockchain.

The terms "web," "web site," "web server," "web client," and "web browser" refer generally to computers programmed to communicate over a network using the Hyper-Text Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

The terms "erasure code" is a forward error correction (FEC) code under the assumption of bit erasures (rather than bit errors), which transforms a message of k symbols into a longer message (code word) with n symbols such that the original message can be recovered from a subset of the n symbols. The fraction r=k/n is called the code rate.

The term "database" means a computer-accessible, organized collection of data, which may be referred to as "content" in this document. Databases have been used for decades to format, store, access, organize, and search data. Traditionally, databases were stored on a single storage medium controlled by a single computer processor, such as a fixed disk or disk array. However, databases may also be organized in a "distributed" fashion, wherein the database is stored on a plurality of storage devices, not all of which are necessarily operated by a common processor. Instead, distributed databases may be stored in multiple component parts, in whole or part, dispersed across a network of interconnected computers.

The term "Difficulty" means proof-of-work mining, or the expected total computational effort necessary to verify the next block in a blockchain. Difficulty is generally determined by the verification rules of the blockchain and may be adjusted over time to cause the blockchain to grow (e.g., new blocks to be verified and added) at a desired rate. For example, in the Bitcoin blockchain network, the difficulty adjusts to maintain a block verification time of about ten minutes across the blockchain network.

It will be understood by one of ordinary skill in the art that common parlance in the computing industry refers to a "user" accessing a "site." This usage is intended to represent technical access to an online server by a user via a user computer. That is, the reference to a "user" accessing a "server" refers to the user manipulating or otherwise causing client software to communicate over a telecommunications network with server software. This also typically means that the user's client software is running on a client computer system and accessing the server computer system remotely. Although it is possible that a user may directly access and use the server via the server hardware, and without use of a client system, this is not the typical use case in a client/server architecture.

One of the major concerns related to the blockchain technology is scalability and in general efficiency/reliability of the whole operation. For instance, every user in this community, sooner or later, directly or indirectly, is forced to deal with challenges of maintaining and managing the cryptographic keys that are used. The subtleties and challenges involved in key generation, maintenance and management are well known in security industry and both cryptographic and policy based solutions have been devised in the past. However, in the context of cryptocurrencies, there are no satisfactory solutions that would help scalability or ease of use. The second major concern is related to computational efficiency of the tasks performed during the execution of the protocols. One of the most computationally intense and most frequently used cryptographic primitives in blockchain technology is digital signatures. The users need to generate every transaction with appropriate authentication done on the transaction and the miners or validators need to verify/validate the same multiple number of times.

In order to handle the challenges and complexities of key management, a number of techniques were proposed and deployed in different cryptocurrencies. In Bitcoin core, the keys are maintained in local storage. A typical user has access to a wallet software and uses the wallet to authenticate transactions being generating. As wallets generate the digital signature, the wallet requires an access to the private key of the user. While this speeds up the wallet operations, the presence of a key for a long time in a system that is online increases its vulnerability. Off-line storage and air gapped storages may be used. Password protected wallets are deployed by certain systems but they do not provide any security against a malware that might read the key strokes etc. Third party hosted wallets are also suggested to remove the pains of key management to a novice user but that usage requires enormous amount of trust in a third party.

In view of the shortcomings of the existing systems, a simple, easy to implement, secure approach to key generation that offers protections against theft/loss of the systems is disclosed. Given that a typical user may have several devices (at least two, say a laptop and a mobile phone/notepad), the "the private key" is split into several components with each component stored on each device. The objective is to have adequate protection: 1) In the case of a loss or corruption of a component of a key. 2) In the case of loss/theft of the device and subsequent abuse of the key component available in the device. 3) Signature generation must involve all the split components. 4) The individual components of the signatures generated in each device is secure on its own and does not lead to any attacks and key exposure.

The (BLS) short signature scheme of Boneh, Lynn and Shacham is quite amenable for such split-ups in which an effective split-up be achieved. Such split-up is not possible in Schnorr signature or Elliptic Curve Digital Signature Algorithm (ECDSA) without sharing information between the two devices that generate the partial signatures.

The transaction generation as well as the block formation/validation involve running computationally intense signing and verification algorithms. Typically, the block size is kept small by design in order to speed up the communication and in small blocks, it is observed that signatures occupy a significant amount of space. For example, it is estimated that nearly 40% of the transcript space is occupied by signatures in case of bitcoin. The computations involved in some of the deployed signature schemes are found to be very complex. For instance, the most widely used Elliptic Curve Digital Signature Algorithm (ECDSA) combines the long term and short term keys in a non-linear fashion and that directly contributes to its inefficiency. Moreover, each block formation calls for verification of a number of signatures (the signatures found in the transactions chosen for pooling) and when the block is broadcast, again the validation process calls for huge number of signature verifications at every node of the network. In this context, aggregate verification offers an efficient solution. In signature aggregation/verification, several signatures are combined into one "super" signature and verification is only performed on the super signature rather than on the individual signature. This leads to a dramatic drop in the verification cost of n signatures to the cost of verifying one signature. This clearly saves space and a significant amount of computing time. In an embodiment, the aggregation of the signatures may be done by the miners generating the block (generator), so that the miners doing the verification (verifier) doesn't have to verify each signature but just verifies the aggregate Nock signature to reduce compute time.

TABLE 1

Split-key Algorithm

| BLS Key | Device 1 | Device 2 |
|---|---|---|
| Private Key: $x \in Z_q^*$ | Accept mnemonic$_1$ | Accept Passcode |
| Public key: $X = xP$ | $x_1 = H_1$ (mnemonic$_1$) | $s_1 = x_2 - H_1$ (Passcode) |
| $\sigma = xH$ (m) | $x_2 = x - x_1$ | Store $s_1$ |
| | Store $x_1$ and $x_2 P$ | |
| | Send $x_2$ to device 2 | |

TABLE 2

Signing Workflow

| Device 2 | Device 1 |
|---|---|
| Accept Passcode | Check if $\hat{e}(\sigma_2, P) \stackrel{?}{=} \hat{e}(H(m), x_2 P)$ |
| $x_2 = s_1 + H_1$ (Passcode) | $\sigma = x_1 H(m) + \sigma_2 = x_1 H(m) + x_2 H(m)$ |
| $\sigma_2 = x_2 H$ (m) | $= xH$ (m) |
| Send $\sigma_2$ to device 1 | Output $\sigma$ as the signature for m |

In an embodiment, the split-key wallet protocol uses a Boneh-Lynn-Shacham (BLS) signature scheme that is based on bi-linear pairings. A pairing, defined as e(,), is a bilinear map of 2 groups G1 and G2 in some other group, GT. e(,) takes e as arguments points in G1 and G2.

Pairings that verifies a signature have the form: e(g1, sig)=e(pk, H(m)) (in expanded form: e(g1, sk*H(m))=e (sk*g1, H(m))=e(g1, sk*H(m)) H(m) is hashing a message to a point on an elliptic curve.

BLS has:
1) KeyGen—choose a random a. Given generator g1, pk=α*g1
2) Sign—σ=α*H(m) E G2 (in the case of eth2.0)
3) Verify(pk,m, σ)—if e(g1, σ)=e(pk, H(m)) return true.

The BLS signature scheme may be used to split keys and let users interact using crypto keys via a blockchain. Since the cryptocurrency balance is maintained against these keys, it's very important to protect the private key. The private key may be split into two secondary keys, storing each of the secondary key on a different device. Signing requires individual signatures from each device. Hence, losing any one device can still protect the primary key. In addition, if desired, one of the secondary keys can be further split into two parts; only one of which is stored on the device and the other may be a simple PIN that the user has to enter each time. This provides an extra layer of protection in case both devices are compromised. In this scheme, it is easy to generate as many split keys as desired providing the ability for the user to periodically rotate the split keys and in the process change the PIN.

With cryptocurrency, some quantity of tokens may be locked. In an embodiment, support may be provided for selling the cryptocurrency by specifying a name for locks, keys to the locks, how long each key is valid (from seconds to centuries), a number of keys, a price of the keys. Tokens acquired may be "locked" for the time each key is valid.

The actual verification is done by a group of machines called the validators.

The validators can be any group of machines, depending on what makes sense in the blockchain ecosystem. Validators are mutually untrusting. In an embodiment, the validators may be a distinct group of machines from the miners and blobbers.

At a high level, the challenge protocol involves three phases: 1) The mining network randomly selects the blobber data allocation to be challenged. This process also specifies the validators who will verify the challenge and provides a random seed to be used for the challenges. This stage is referred to as the challenge issuance. 2) In the justification phase, the blobber broadcasts the data to the validators along with the metadata needed to verify the challenge. 3) Finally, in the judgment phase, the validators share their results. Once the validators have agreed on the results of the challenge, they write a transaction to the blockchain indicating whether the test passed. This transaction also pays the validators and rewards the blobber.

Selecting validators is a particular challenge. In a cronyism attack, a blobber sends the data to a friendly validator who approves all challenges without validating the data. In an extortion attack, a validator demands additional compensation from the blobber in exchange for passing the challenge.

These attacks are avoided by having the mining network randomly select a set of validators. For a challenge to pass, at least N validators must approve the results of the challenge. The difference between these values must be narrow enough to make a successful cronyism attack unlikely, but high enough to prevent an extortion attack. An additional concern is that the validators actually do the verification work. A validator who does not do the work but who attempts to collect the reward is called a freeloader.

Challenge Issuance Phase: The mining network must initially post a transaction to the network by randomly challenging a blobber providing storage. This challenge issuance transaction may include: 1) The allocation of data challenged, identified by allocation_id. Note that this should implicitly identify which blobber is challenged. 2) The list of eligible validators. 3) A random seed, which determines the indices of the data blocks in that allocation that the blobber must provide. 4) The latest write marker at the time of the challenge. Conceptually, this challenge issuance transaction is comparable to a roulette wheel, where the number of tokens currently due to the blobber from its challenge pool dictates its number of slices on the wheel. An alternate approach would be to use the size of the data allocation instead, but this can lead to a subtle attack. A blobber could post an agreement for a negligible price with itself as the client, and then commit to storing large amounts of easily regenerated data. With a commitment to a large enough amount of data, other blobbers would be challenged only with a low probability. By tying the probability of being challenged to the amount of tokens in the challenge pool, this attack becomes prohibitively expensive to carry out. The initial transaction essentially locks a portion of the blobber's stake and reward in a sub-pool specific to this challenge. A "guilty until proven innocent" approach is used to prevents a blobber from attempting a denial-of-service attack against a validator in order to avoid punishment. If the blobber never satisfies the challenge, the tokens are effectively burned.

Justification Phase: When the blobber observes the challenge issuance on the blockchain, it broadcasts its proof of storage to the validators with: The file system metadata. The write marker proving that file system contents match what is stored on the blockchain. The challenged blocks of data are chosen pseudo randomly using the miner's random seed and the Merkle paths of those data blocks.

Once the validators receive the blobber's data, they each verify the data that they have been sent. The validator verifies that: The file system metadata is valid. The file system root hash matches the write marker. The write marker matches the most recent commitment to the blockchain. At this point, the validator has established that the blobber's metadata is valid and matches the blockchain. The validator then calculates the number of blocks on the system from the allocation size. Using the random seed, the validator verifies that the blobber's blocks correspond with the pseudorandom sequence. (This serves to make every block of data on the system equally likely to be challenged, and ensures that the blobber did not try to game the results).

For each data block, the blobber verifies that the Merkle path matches up to the file metadata. As part of this process, the validator stores the two penultimate hashes of the Merkle tree; that is, it stores the two hashes that can be hashed together to give the file's Merkle root. These two hashes are called the validation proof.

At most one of the hashes in the validation proof should have been provided by the blobber. (To ensure this behavior, the inclusion of additional hashes on the Merkle path is an automatic failure.) Therefore, the validator must have done the work to calculate at least one of the two hashes. This validation proof can be verified easily by the other validators. These proofs are an important part of the disclosed defense against freeloaders.

Judgment Phase: After the validator has completed its work, it broadcasts the signed hash of its results. This signed hash is called the pre-commit. The hash format is H=hash (validationProof List_R), where validation Proof List is a list of the hash pairs serving as validation proofs for each file, and R is a randomly chosen nonce selected by the validator.

The validator then waits to collect the pre-commits for the other validators. Once the timeout period has been reached, it broadcasts its validProof List and its R value to publish its results. No additional pre-commits are accepted at this point. (If less than the minimum number of required signatures is received, it will rebroadcast and wait again).

The validator accepts the signatures of all other validators with valid proofs. provided that the other validators submitted valid pre-commits. Since the results are not publicly observable until after the results are completed, a freeloader is not able to provide a valid pre-commit. Each validator submits a transaction to the blockchain with its results. The smart contract accepts the first transaction it receives, and only the first. At this point, the blobber receives its reward and the validators receive payment for their work. The payout amount is pro-rated to match the total payout and the length of the contract. For instance, if blobber Bob's challenge pool contains 12 tokens from Alice for storage paid over a contract period of 90 days, and the first challenge happens at day 45, Bob receives 6 tokens for passing the challenge. If Bob is again challenged at day 60, Bob receives an additional 2 tokens. On day 90, Bob receives the remaining balance of 4 tokens.

The validators are paid in a pro-rated manner like the blobber is rewarded. An equal portion of the reward is set aside for every validator, even those that did not participate in the validation. However, the rewards are only distributed to validators who participated in the validation process; the reward for non-participating validators is burned. This design ensures that validators have no incentive to exclude each other; instead validators have a strong incentive to perform the validation work.

FIG. 1 depicts a blockchain system 100 illustrating an example of a blockchain platform based on a message flow model for implementing different distributed applications. In the example of FIG. 1, the environment includes a plurality of clients 110, client 1 112, client 2 114, . . . , client n 116. The environment includes a plurality of miners 120, miner 1 122, miner 2, 124, . . . , miner n 126. The system includes a plurality of blobbers 130, blobber 1 132, blobber 2 134, . . . , blobber n 136. Although many clients, miners, and blobbers are supported, references to client 110, client system 110 or client device 110 will be used to indicate a selected plurality of client systems. References to miner 120 or miner system 120 will be used to indicate a selected plurality of miners. References to blobber 130 or blobber system 130 will be used to indicate a selected plurality of blobbers. Each client system [112, 114, . . . , 116] may include components to store, update, get, read, write and/or delete requests. In an embodiment, any client system may include storage requests. A client can implement many types of flexible and distributed applications on the client system 110 using the client aspect of the blockchain platform using a message flow model. In the embodiment, the miner 120 includes components to process requests from the clients including storage requests. Two or more miners form a mining network. In the embodiment, the blobber 130 includes components to fulfill storage requests that are initiated by the client 110 and approved by miner 120.

Network 140 can be different wireless and wired networks available to connect different computer devices including client and server systems. In an implementation, network 140 is publicly accessible on the internet. In an implementation, network 140 is inside a secure corporate wide area network. In an implementation, network 140 allows connectivity of different systems and devices using a computer-readable medium. In an implementation, the blockchain platform using a message flow model allows users on the client system, the blobber or the miner to set privacy settings that allow data to be shared among select family and friends, but the same data is not accessible to the public. In an implementation, the blockchain platform using a message flow model allows users on the client system, the blobber or the miner to encrypt data to be shared among select family and friends, but the same data while available cannot be decoded by the public.

The messaging and notification between different components can be implemented using Application Programming Interface (API) calls, extensible markup language ("XML") interfaces between different interfaces, Java/C++ object oriented programming or simple web-based tools. Different components may also implement authentication and encryption to keep the data and the requests secure.

Figure 2:
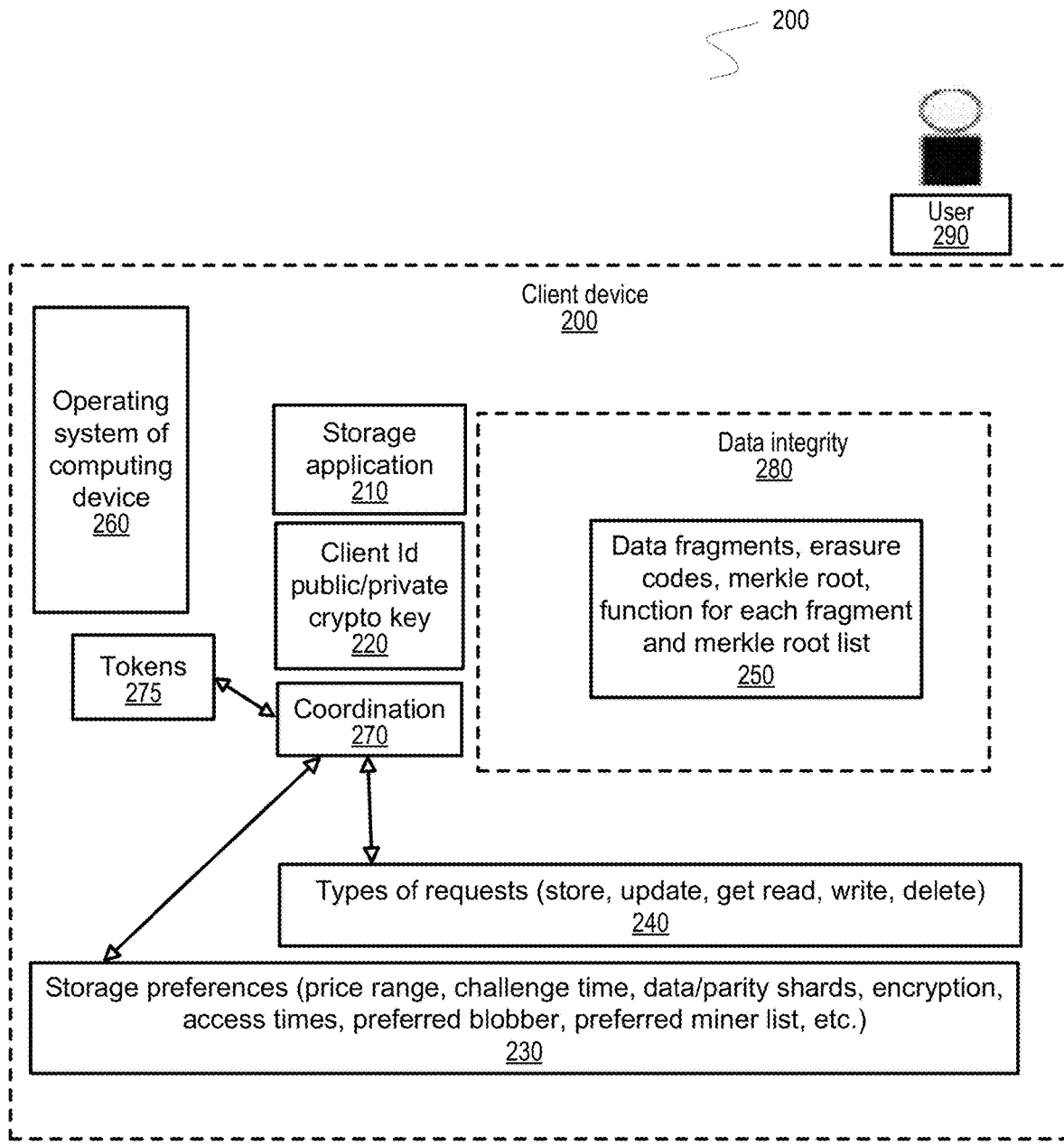
FIG. 2 depicts an embodiment of a client device.

FIG. 2 depicts a client device 200 which is an exploded view of a client system 110 shown in FIG. 1. For a distributed storage application implementation, the client has a storage application 210 that interacts with the operating system 260 of the client device 200. In an example embodiment, the client computing device may have family photos, videos or business-related files for storage. The client device 200 may use the Diffie-Hellman key exchange method with another client, for example client 2 112. The Diffie-Hellman key exchange method allows two parties that have no prior knowledge of each other to jointly establish a shared secret key over an insecure channel, such as, network 140. This key can then be used to encrypt subsequent communications using a symmetric key cipher. The client uses a client_id 220 with a Diffie Hellman public and private cryptography keys to establish session keys. In one embodiment, the client and the blockchain platform uses Transport Layer Security, i.e. symmetric keys are generated for each transaction based on a shared secret negotiated at the beginning of a session. The client 200 gets preauthorized tokens 275 for storage allocation on the blockchain platform. The storage preferences for the client may have a default coordination 270. In an example embodiment, a client's storage preferences 230 include price range, challenge time, data/parity shards, encryption, access times, preferred blobber, preferred miner lists, etc. Types of requests 240 include store, update, get, read, write and/or delete requests. The data integrity 280 includes techniques to create a hash based on available data, encryption of the data, division of data into fragments, use of erasure codes, Merkle root and Merkle tree creation based on data fragments, erasure codes, a function for each fragment and a Merkle root list for different types of data 250. A client may use one or more options in different types of combinations to preserve data integrity 280 verification when sending data out on the system to different blobbers on the blockchain platform. In one implementation, the client has an option to create its own data_id for selected data. In one implementation, the client gets an automatically generated data_id based on different client preferences and parameters of usages. A user 290 is shown using the client device 200. In one implementation, the client system includes module to report errors when a blobber does not send an anticipated message. In one implementation, the client system monitors the blockchain for different suspicious activities related to its own work.

Figure 3:
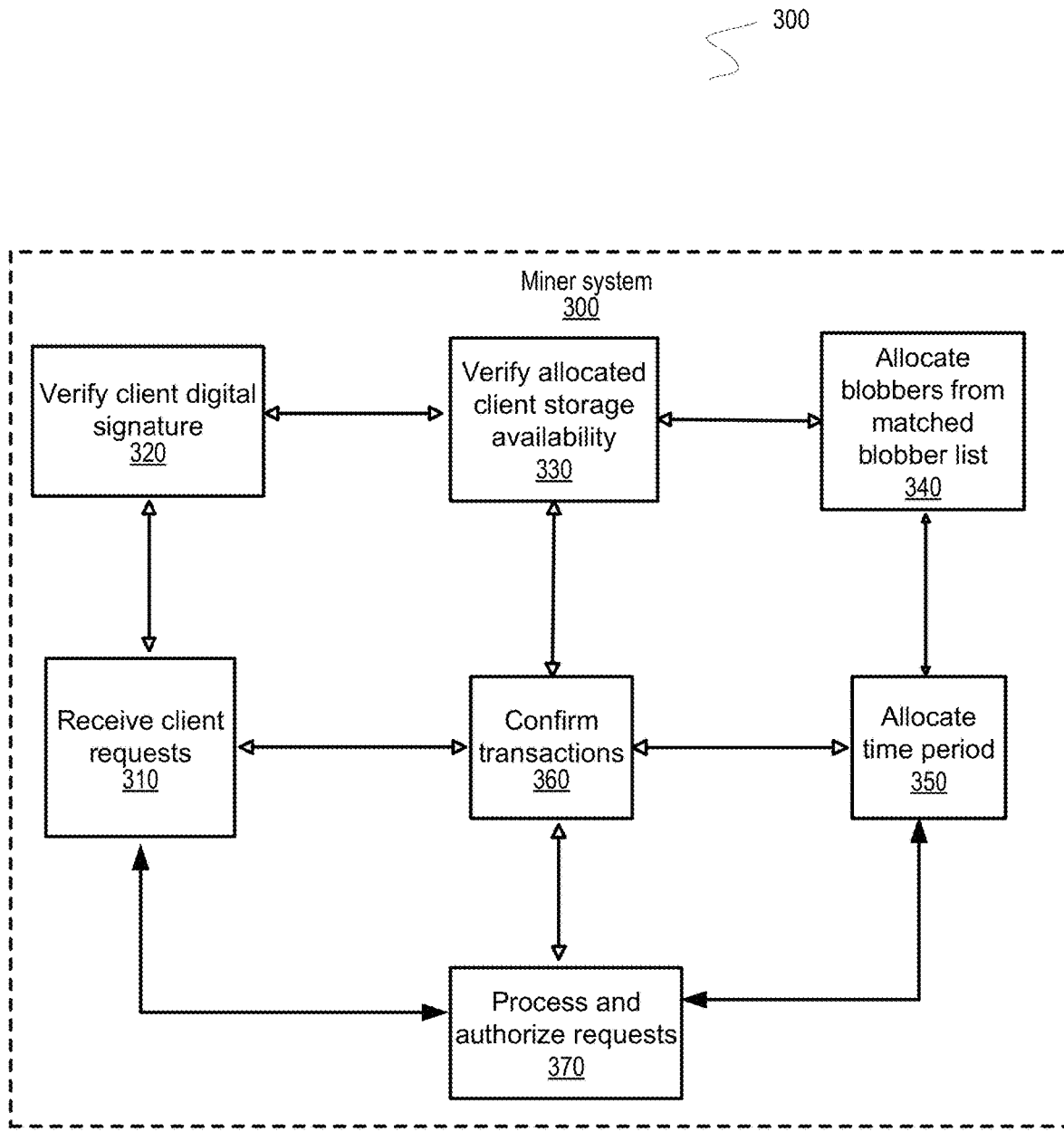
FIG. 3 depicts an embodiment of a miner system.

FIG. 3 depicts a miner system 300 which is an exploded view of miner system 120 of FIG. 1. The different components or modules included in a miner system includes a module to process and authorize requests 370, receive client requests 310, verify client digital signature 320, verify whether client is allowed to make a particular request based on allocated storage for a client and availability on the system 330, allocate blobbers from a matched blobber list 340, allocate time period to complete the transaction 350, and confirm transactions 360 on the blockchain platform. In one embodiment, the miner system includes module to monitor the blockchain for different suspicious activities. In one embodiment, the miner system includes mechanism to handle error reports received from either a client or a blobber. In one embodiment, the miner system 300 includes ranking or evaluations for clients and/or blobbers associated with the blockchain platform.

Figure 4:
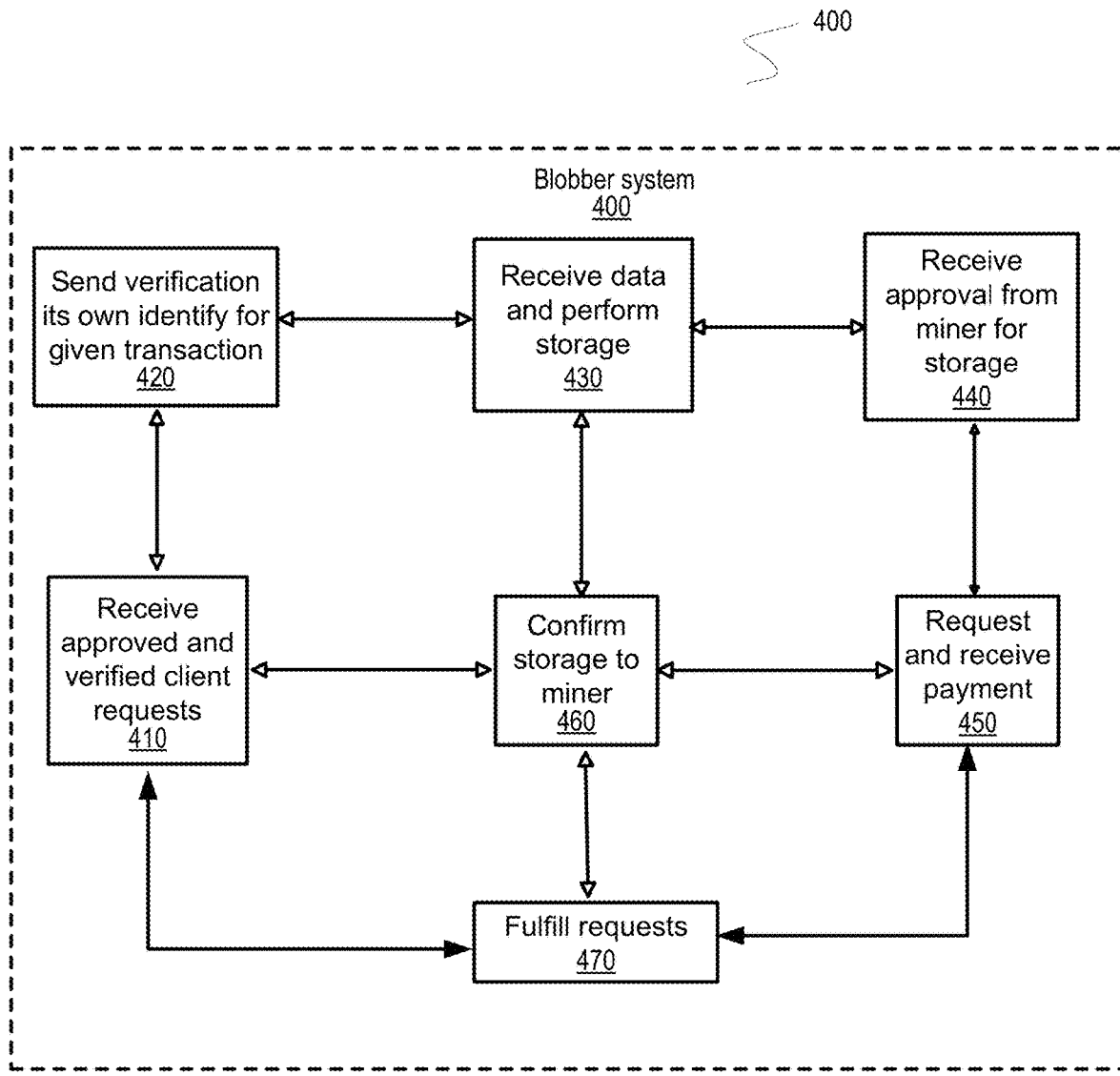
FIG. 4 depicts an embodiment of a blobber system.

FIG. 4 depicts a blobber system 400 which is an exploded view of a blobber system 130 of FIG. 1. The different components or modules included in a miner system includes a module to fulfill requests 470, receive approved and verified client requests 410, send verification of its own identity for a given transaction 420, receive data and perform storage 430, receive approval from miner for storage 440, confirm storage to miner 460, request and receive payment for storage and handling of the requests 450. In one embodiment, the blobber system includes a module to report errors when a client does not send an anticipated message. In one embodiment, the blobber system monitors the blockchain for different suspicious activities related to its own work.

Figure 5:
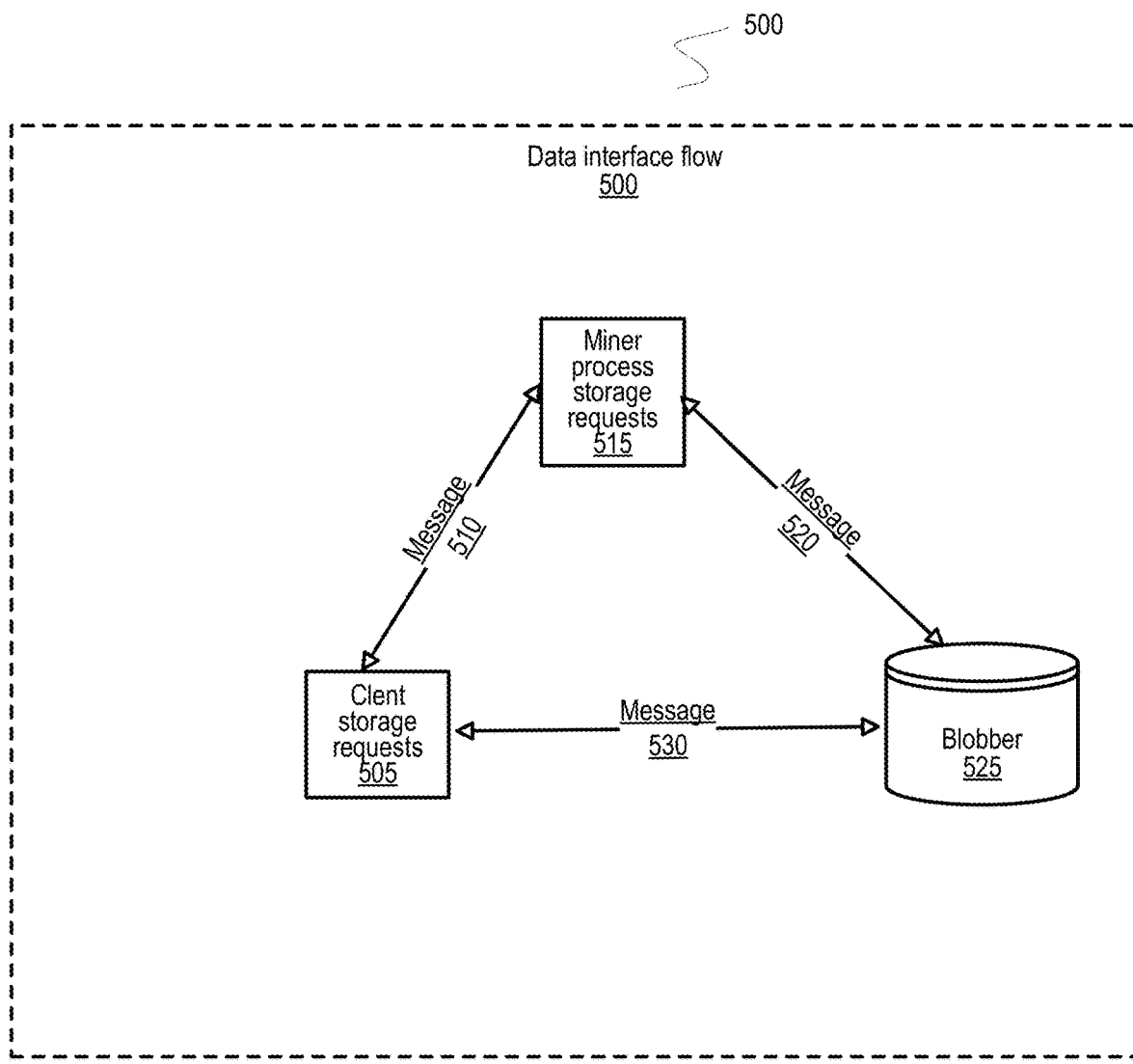
FIG. 5 depicts a data interface flow between client storage requests and a bidirectional message flow between different role based entities on the blockchain system.

FIG. 5 shows the data interface flow 500 between client storage requests and a bidirectional message flow between different role based entities on the blockchain. The message 510 is a request and acknowledge between a client 110 making client storage requests 505 and a miner 120 with the miner processing storage requests 515. The message 520 may be a verification of a storage request 510 or may be an acknowledgement of allocating blobber 525 like blobber 130 to handle the client store requests 515. The message 530 is the bidirectional message between client and blobber to fulfill the request.

Figure 6:
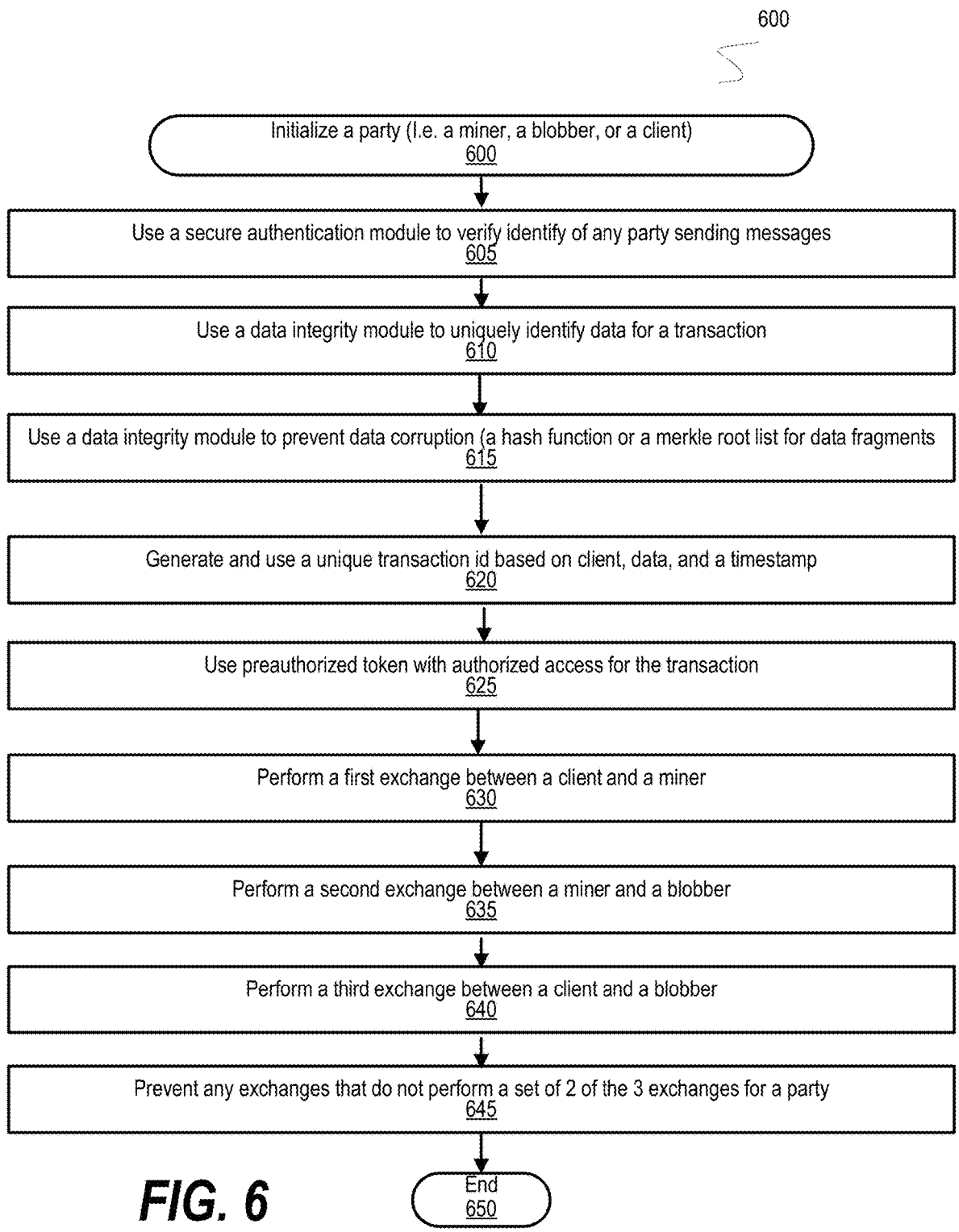
FIG. 6 depicts a flowchart illustrating an example of using a message flow model.

FIG. 6 depicts a flowchart 600 illustrating an example of a method for a blockchain platform using a message flow model based on role-based entities. The flowchart 600 is discussed in conjunction with the blockchain platform environment shown in the diagram 100 in FIG. 1. At block 600, a client, miner and/or a blobber system is initialized to use the blockchain platform using message flow model based on role-based entities. At block 605, use a secure authentication module to verify identity of any party sending messages. In one embodiment, this is achieved by assigning a client id or blobber id used in combination with Diffie-Hellman public and private keys. In one embodiment, the client and blobber use a secure connection using Transport Layer Security. In one embodiment the miners are also assigned miner ids and secure cryptographic certificates to ensure that the miner is trusted. At block 610, use data integrity module to uniquely identify data for a transaction. At block 615, use data integrity module to prevent data corruption, for example, a hash function or a Merkle root list for data fragments. At block 620, generate and use a unique transaction id based on the triple of client_id, data_id and a timestamp. At block 625, use preauthorized token with authorized access for the transaction. At block 630, perform a first exchange between a client and a miner. The first exchange is shown in FIG. 5 at block 515. At block 635, perform a second exchange between a miner and a blobber. The blobber checks the output of miner to see which clients have registered an allocation. At block 640, perform a third exchange between a client and a blobber. The third exchange is shown in FIG. 5 at block 530. At block 645, prevent any exchanges that do not perform a set of two of the three exchanges for an entity. At block 650 the flow ends.

Figure 7:
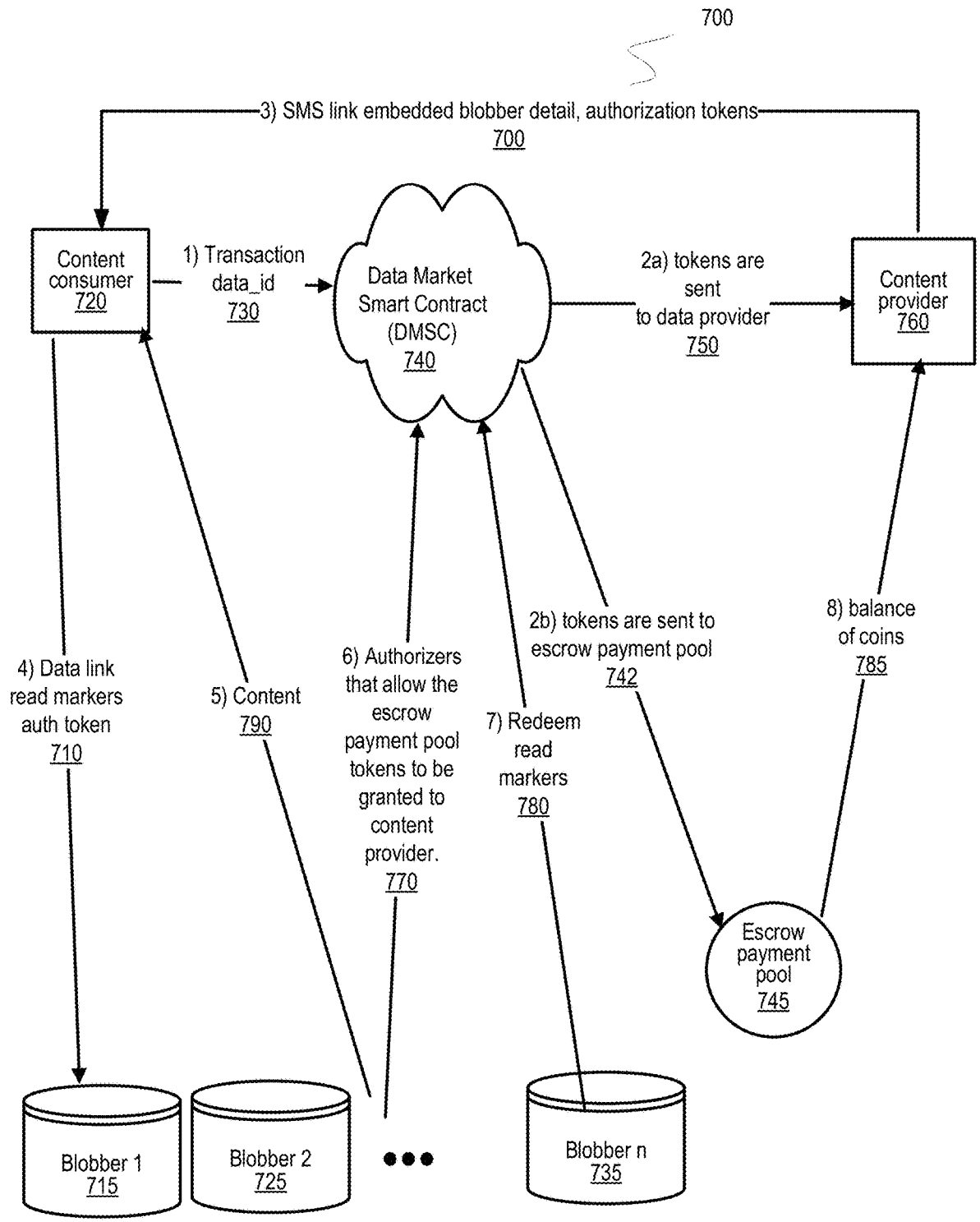
FIG. 7 depicts a schematic flow of an embodiment for purchasing a content utilizing smart contracts.

FIG. 7 depicts a schematic flow of an embodiment for purchasing a content utilizing smart contracts. The content consumer 720 invokes a data market smart contract (DMSC) 740 utilizing a transaction data_id 730. The data_id 730 is some representation that identifies what content the content consumer is wishing to purchase. The content provider may have described the content and provided a link to the content or some data_id that includes information such as the content provider 760. The smart contract causes at least two actions to occur: 2a) tokens are sent to content provider 750 and 2b) tokens are sent to escrow payment pool 742. The content provider 750 receives the tokens at block 760. The escrow payment pool receives the tokens at step 745. In a typical scenario most of the tokens will be in the escrow pool. The content provider 760 may use a short message service (SMS) link to transfer information including embedded blobber details and authorization tokens 700 to content consumer 720. The content consumer 720 then sends data link read markers and authorization token 710 to a selected set of blobbers, blobber 1 715, blobber 2 725, . . . , blobber n 735. As the blobbers retrieve the content 790, the content 790 is received by the content consumer 720. When the content 790 is fully read by the content consumer 720, and verified by authorizers (that allow the escrowed funds from the escrow payment pool 745) to be granted to the content provider 760 via communication 785. Then the read markers may be redeemed 780 by the content provider 760.

Figure 8:
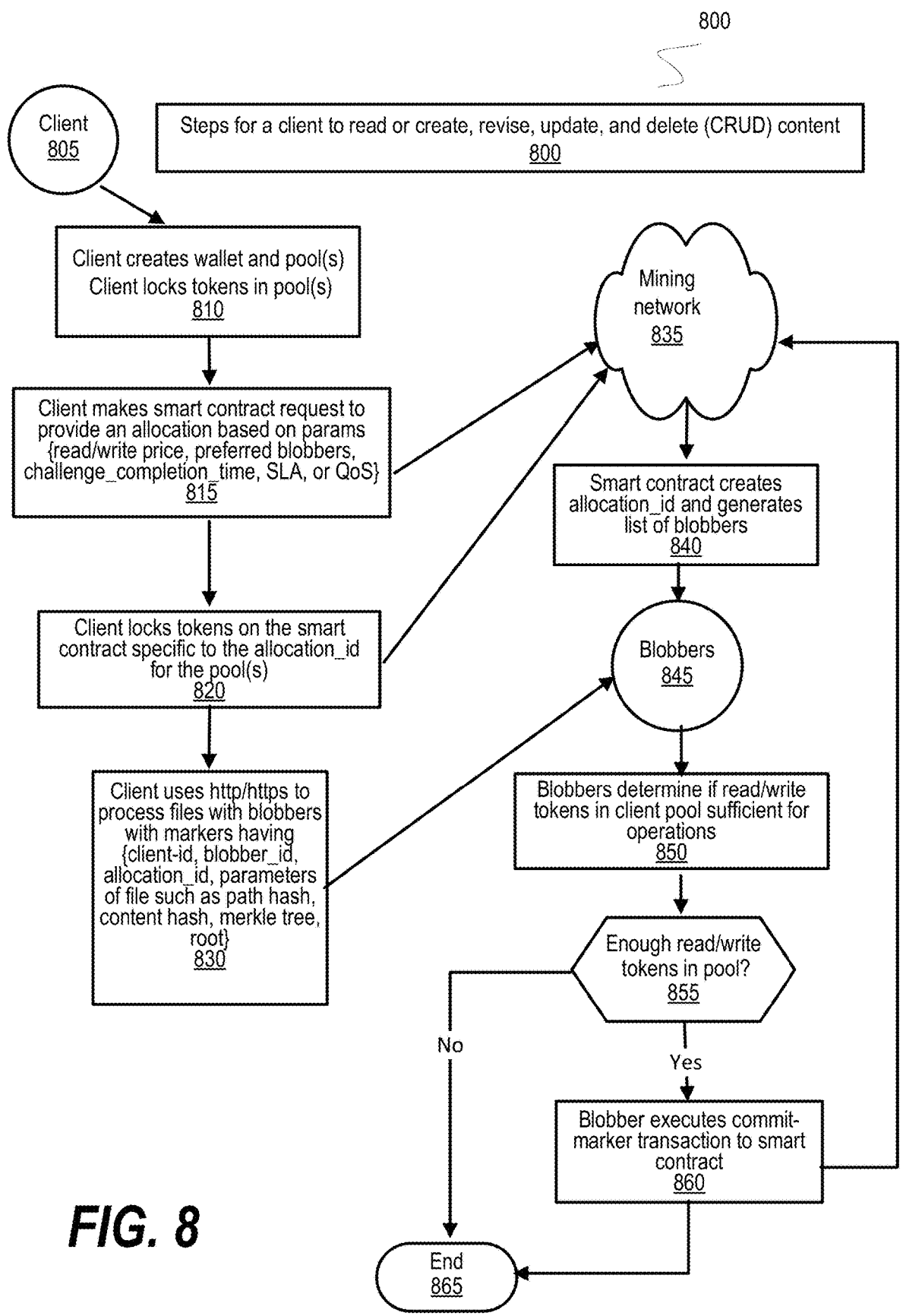
FIG. 8 depicts a process for a client to read or create, revise, update, and delete content (CRUD)

FIG. 8 depicts a schematic flow of an embodiment that shows the steps taken by a process for a client to read or create, revise, update, and delete (CRUD) content 800 utilizing the blockchain infrastructure. The process is based on a message flow model of role-based exchange of communication messages. The message flow may use a transport layer security (TLS) connection and permit or prohibit some operations based on the state of the connection. The client and blobber must negotiate a price for writes and a price for reads, both in terms of tokens/gigabyte of data. Other criteria may be negotiated between the client and blobber as needed, allowing the blockchain to serve as a public record of their agreement. Once terms have been established, the client writes a transaction to the blockchain with the terms of their agreement. This transaction is called the storage agreement transaction, which includes:

The id of the client (client id).
The id of the blobber (blobber id).
The allocation_id identifying this storage allocation, referring to the data that the blobber stores for the client. This globally unique ID is a function of client id, blobber id, and a timestamp.
The tokens of reward paid to the miner per gigabyte read (read price).
The tokens of reward paid to the miner per gigabyte uploaded (write price).
A params field for any additional requirements.
The signatures of both the client and blobber.
Offer expiration time, to ensure that the client does not invoke an old agreement that is no longer profitable for the blobber.

Storage duration, determining how long the blobber needs to provide storage. After this period has elapsed, the blobber no longer needs to store the client's files; of course, the client and blobber can negotiate to extend the storage period.

This transaction also initializes a read counter and write counter for the client and blobber to use in their interactions, both initially set to 0. These values increase with each transaction depending on the amount of data uploaded or downloaded. By calculating the last counter value with the new counter value, the amount of reward the blobber has earned is determined easily. This transaction may also create two new pools:

The blobber reward pool, containing the interest that the client generated as the rewards for the blobber to store and serve data.

The challenge pool; when the blobber verifies that it is storing the data, it may receive some portion of the reward stored in this pool.

When the funds in the blobber reward pool are depleted, the client may lock additional tokens to add funds to them. The challenge pool is initially empty, but gains tokens with every write that the client does. (Reads, in contrast, are paid to the blobber directly.) In the storage contract transaction, the client locks tokens and pays the interest to the blobber reward pool. These tokens represent the blabber's pay for storing the client's data. A portion of these funds are allocated for the validators. Blobbers are paid for every file uploaded, and they are expected to store the files until the end of the contract period negotiated with the client. (A client can elect to delete files stored with the blobber, but does not receive any refund for doing so). Note that they are not paid immediately. The funds are set aside in the challenge pool; the blobber receives tokens from this pool upon satisfying a challenge to prove that they are actually storing the data. The client transfers files and the corresponding metadata. This step may be repeated until all files have been uploaded. The client uploads a signed write marker, which serves as the client's commitment to the file system contents.

At step 810, the client 805 creates wallet and pool(s). Client locks tokens in pool(s). Typically, a read pool separated from a write pool. These can include support for not only the client, but also a 3rd party. At step 815, the client makes a smart contract request to the mining network 835 for processing based on params {read/write price, preferred blobbers, a challenge_completion_time, a service-level agreement (SLA), or a Quality of Service (QoS}. At step 840, the smart contract creates an allocation_id and generates a list of blobbers 845. At step 820, the client locks tokens on the mining network 835 for the smart contract specific to the allocation_id for the pool(s). At step 830, the client uses http/https to process files with blobbers with markers having {client_id, blobber_id, allocation_id, parameters of file such as path hash, content hash, merkle tree, root}. The connection may be between clients 110 and blobbers 130 with the authorization of one or more miners from the mining network 140 containing, for example, miner 120. At step 840, the smart contract creates allocation_id and generates a list of blobbers. At step 850, the blobbers determine if read/write tokens in the client pool(s) are sufficient for operations. The process determines as to whether enough read/write tokens in pool(s) (decision 855). If enough read/write tokens in pools, then decision 855 branches to the 'yes' branch. On the other hand, if not enough read/write tokens in pool, then decision 855 branches to the 'no' branch. At step 860, the blobbers execute commit-marker transaction to smart contract. FIG. 8 processing thereafter ends at 865.

Figure 9:
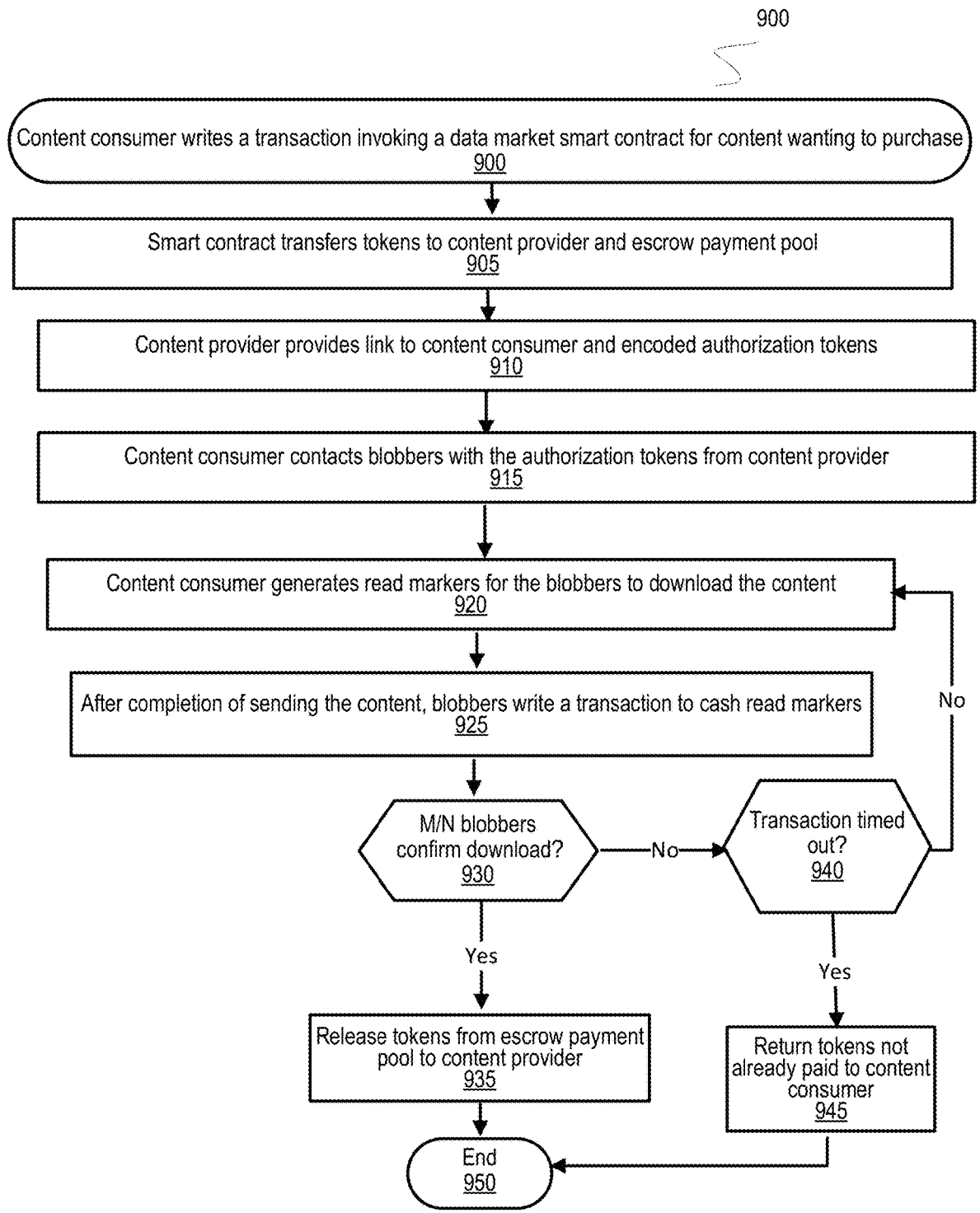
FIG. 9 shows the steps taken by a process to purchase content.

FIG. 9 processing commences at 900 and shows the steps taken when a content consumer writes a transaction invoking data market smart contract for content wanting to purchase. At step 905, the smart contract transfers tokens to content provider and escrow payment pool. At step 910, the content provider provides link to content consumer and encoded authorization tokens. The encoded authorization tokens include a re-encryption key that allow the encrypted content to be de-encrypted and re-encrypted using the re-encryption key. At step 915, the content consumer contacts blobbers with the authorization tokens from content provider. At step 920, the content consumer generates read markers for the blobbers while downloading the content. At step 925, after completion of reading the content, blobbers write a transaction to cash read markers. A determination is made as to whether M/N blobbers confirm download (decision 930). If not M/N blobbers confirm download, then decision 930 branches to the 'N' branch. If M/N blobbers confirm download, then decision 930 branches to the 'Y' branch. At step 935, tokens are released from the escrow payment pool to content provider. A determination is made as to whether transaction timed out (decision 940). If not transaction timed out, then decision 940 branches to the 'no' branch which loops back to 920. This looping continues until the transaction timed out, at which point decision 940 branches to the 'yes' branch exiting the loop. At step 945, tokens not already paid are returned to the content consumer. FIG. 9 processing thereafter ends at 950.

Figure 10:
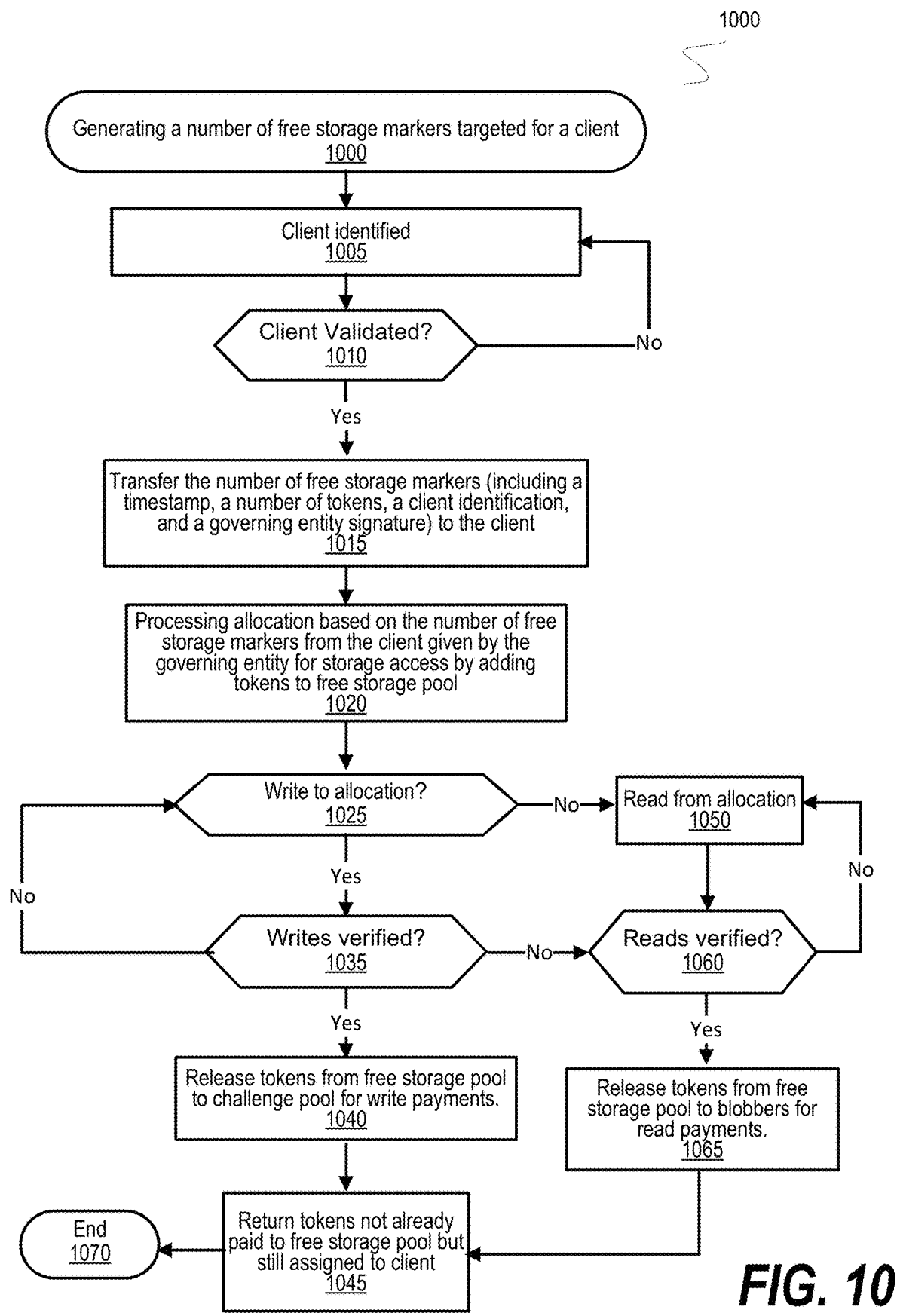
FIG. 10 shows the steps taken by a process to substitute a first blobber with a second blobber.

FIG. 10 depicts a process of providing free storage for a client. Processing commences at 1000 by generating a number of free storage markers targeted for a client. The client may be, for example, an individual user that expressed an interest in utilizing the blockchain or some group of people targeted by some campaign criteria. Alternatively, the client may business or commercial customer. At step 1005, the process client is identified. In an embodiment, the client may use a specialized application tailored for interfacing with the blockchain system. The process determines as to whether client validated (decision 1010). If client validated, then decision 1010 branches to the 'yes' branch. On the other hand, if not client validated, then decision 1010 branches to the 'no' branch which loops back to 1005. This looping continues until client validated, at which point decision 1010 branches to the 'yes' branch exiting the loop. At step 1015, the process transfers the number of free storage markers (including a timestamp, a number of tokens, a client identification, and a governing entity signature), to the client. At step 1020, processing allocation based on the number of free storage markers from the client given by the governing entity for storage access by adding tokens to free storage pool. The process determines as to whether write to allocation (decision 1025). If not write to allocation, then decision 1025 branches to the 'no' branch. The process determines as to whether writes verified (decision 1035). If not writes verified, then decision 1035 branches to the 'no' branch which loops back to 1025. This looping continues until writes verified at which point decision 1035 branches to the 'yes' branch exiting the loop. At step 1050, the process read from allocation. The process determines as to whether reads verified (decision 1060). If nit read verified, then decision 1060 branches to the 'no' branch which loops back to 1050. This looping continues until reads verified at which point decision 1060 branches to the 'yes' branch exiting the loop. At step 1040, the process releases tokens from free storage pool to challenge pool for write payments. At step 1065, the process releases tokens from tree storage pool to blobbers for read payments. At step 1045, the process returns tokens not already paid to free storage pool but still assigned to client. FIG. 10 processing thereafter ends at 1070.

In an embodiment, free storage may be provided to clients, allowing the client to try the blockchain platform and to encourage consumption of storage space (and thus provide incentives for entrepreneurs to provide storage for the blockchain platform). At a high level, this design relies on the blockchain platform to verify clients' identities and to give them a marker for free storage. The client then redeems that marker on the blockchain platform, generating funds specifically earmarked for reads and writes. In an embodiment, a client can send referrals, inviting other people to get free storage through the blockchain platform. If the referrals lead to new clients, the referring client can earn additional storage for itself. For home users, a phone number can be used to validate the user's identity. For enterprise customers, we assume a pre-existing relationship between the enterprise and the blockchain platform, allowing the enterprise's email domain to be used for identity validation instead.

The processing of the free markers utilizes most of the same blockchain infrastructure in FIG. 8 and corresponding text complemented with the following variations.

The tokens for the free storage are stored in a token pool (the free storage token pool) on the blockchain. Once the pool has been depleted, free storage is no longer available. If a client terminates their storage, any unused tokens are returned to the free storage token pool. However, if a client has not yet used up their allotment of tokens, they may elect to renew their free storage for whatever portion of tokens was unused, provided that there are still available tokens in the free storage token pool.

A token pool may be an account of the blockchain platform tokens that (generally) may only be accessed through special markers. The relationship between a token pool and markers is roughly analogous to a checking account and checks drawing on that account. However, markers are typically tied to providing some service, and may additionally serve as a "handshake" between the user and the service provider.

In the disclosed protocol, the blockchain platform has a controlling entity, for example, a president, or a board of directors of a corporation that sets a policy. In an embodiment, that policy is authorized by the controlling entity which becomes a trusted party that authorizes the withdrawal of the blockchain platform currency, which may be referenced as tokens from the free storage token pool. The blockchain platform is responsible for verifying the identity of a user and for issuing a free storage marker which authorizes the user's request for free storage for the network and includes details of the terms of usage. Once the marker has been issued, the protocol continues without interference from the blockchain platform. The blockchain platform miners receive the marker from the user, create a new storage allocation for the user, and transfer blockchain currency to token pools to pay for the user's reads (the read pool) and for the user's writes (the write pool).

Identity Verification

Home users must first validate their identity. This process may work as follows:

1) The client uses the free storage application and enters their phone number to request free storage. If the client was referred to the blockchain platform by another client, then the client ID of the referring client is included in this request.
2) the blockchain platform verifies that the phone number has not been previously used and sends the user a text message with a random verification code to verify their phone number.
3) The user enters the verification code into the free storage application.
4) the blockchain platform stores the user's phone number and provides a free storage marker.

Enterprise customers are assumed to have a pre-existing relationship with the blockchain platform. For employees of the enterprise customer, they may instead register for free storage with an email address from the domain of the enterprise customer. The process otherwise remains unchanged, and the allocation is recorded as belonging to the enterprise customer.

Free Storage Marker

The free storage marker is signed by the blockchain platform, and is used by the network to determine the details of the free storage.

The marker contains:

A timestamp, to prevent a marker being redeemed multiple times.
Amount of tokens allocated.
Client ID.
The signature.

Creating Free Allocation

Once the client has received the free storage marker, they may use it to get free storage. This process may work as follows:

1) The client writes a transaction to create a new allocation on the blockchain. This follows the normal process for new allocations, except
    a) client cannot select preferred blobbers
    b) marker is included as part of this transaction
2) The mining network accepts the transaction, verifying:
    a) marker is signed by the blockchain platform
    b) marker has not expired
    c) total supply of tokens for free storage has not been used up
    d) client ID specified in the marker matches the ID of the client writing the transaction
3) A new read pool and a new write pool are created for the allocation, with funds drawn from the free storage token pool. The client may distribute the tokens between the two pools as they see fit; however, the app offers default distributions to avoid confusing new users.

The client may then write to their allocation and read from it as per normal. As mentioned previously, when the terms elapse for the allocation, any unused tokens in the read pool or the write pool are returned to the free storage token pool.

Renewing Free Storage

If a client has not used their allotment of tokens before the terms of storage expire, the client may opt to renew their free storage by writing a transaction to the blockchain. Whatever portion of tokens that had not yet been used are then reallocated to the read pool and write pool. In an embodiment, the allocation of free storage is correlated to the value of the token, and not to a fixed amount of storage. As a result, a client may get free storage for life if the blockchain currency token price continues to rise faster than the user is consuming the storage. It is also possible that the blockchain platform might increase the offers of storage or allow users to draw more free tokens after they have consumed their previous allotment. In these cases, the user would need to provide an updated free storage marker as part of their renewal transaction.

Rewards for Referrals

A client may earn additional free storage by for referring new clients to the blockchain platform. This process is handled by the blockchain platform through the application. When the client earns additional storage, they must use the application to redeem their rewards and receive a new free storage marker. From the protocol standpoint, the miners do not need to know that the additional storage is due to referrals. Instead, they use the standard process of rewarding whatever additional storage is specified by the free storage marker.

Transaction Fee Discussion

The disclosed free storage protocol is designed so that the client does not need to initially possess any the blockchain platform tokens (blockchain currency) in order to use the service. For reads and writes, this goal is achieved easily since the blobbers are responsible for redeeming the write markers on the blockchain. In fact, the only transaction that the client needs to write is the initial transaction to create the allocation (in step 1 under Creating Free Allocation).

To make the allocation creation transaction "free" (in the sense that the client does not pay the fee), the transaction fee is paid using tokens from the free storage token pool.

Owner Pay Versus Receiver Pay

In an embodiment, the blockchain platform may use an owner pay model, where the owner pays for any authorized users that download the owner's content. With owner pay, the owner sends an authorization token to the reader. In addition to giving the reader permission to access the data, the authorization token grants the reader the right to generate a certain amount of read markers that may draw on the owner's read pool. The reader then sends both the markers and the authorization token to the blobbers.

Alternatively, or in addition, the blockchain platform may also supports a receiver-pay model, where a client can read from another client's allocation (if authorized) by paying for the reads using their own token read pool. With this design, a client may read data even when the owner is unwilling to pay for the reads. A client using the free storage application can use their read pool in this manner if so desired.

Handling Failures

One question that might arise is how to handle failure cases. For instance, if the client's machine fails in the middle of the protocol, they may be unable to collect the needed authorization tickets. Fortunately, in this case or similar failure cases, the protocol can be repeated without adverse effect.

Figure 11:
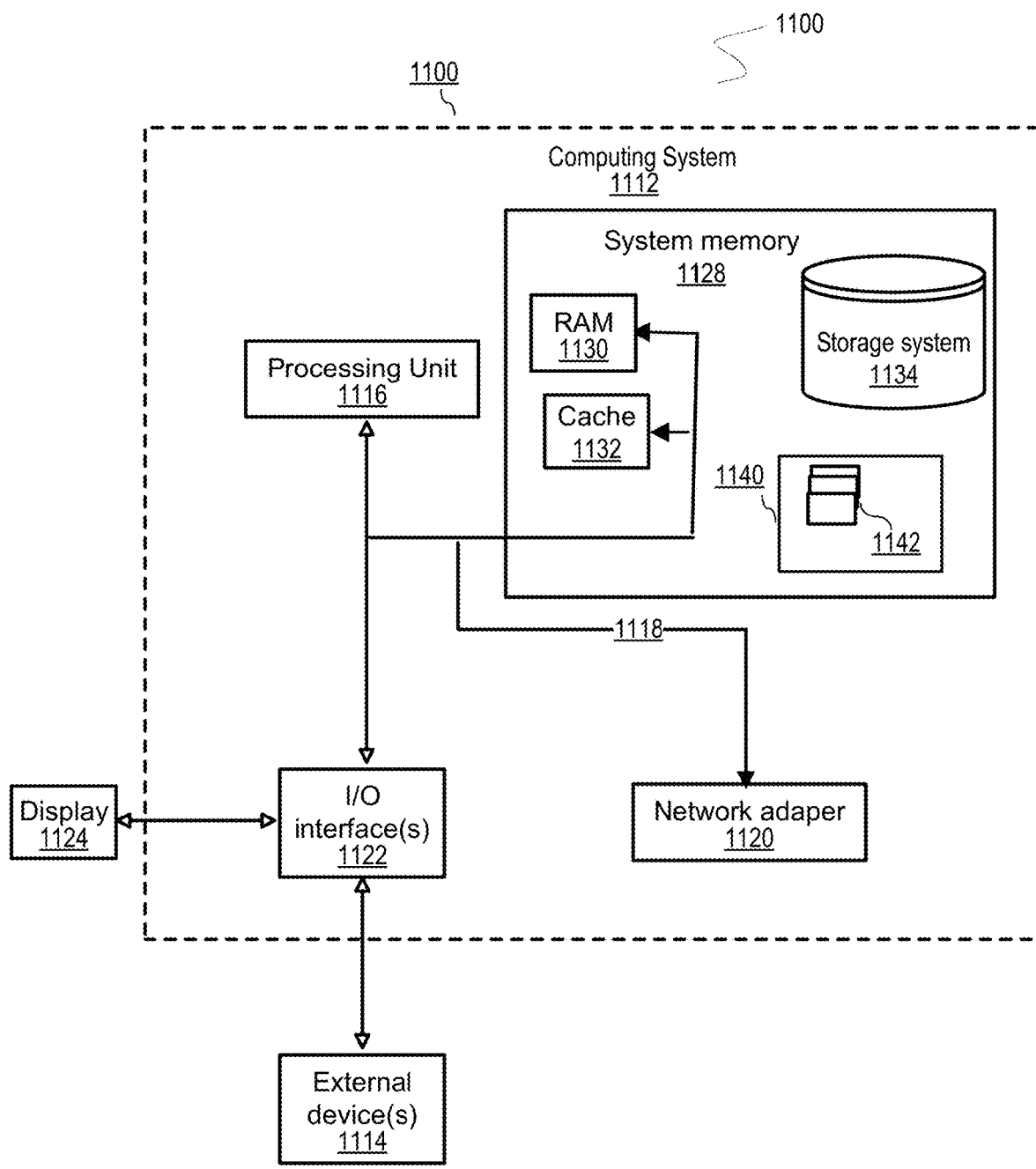
FIG. 11 depicts a schematic view of a processing system wherein the methods of this invention may be implemented.

Referring to FIG. 11, a schematic view of a processing system 1100 is shown wherein the methods of this invention may be implemented. The processing system 1100 is only one example of a suitable system and is not intended to suggest any limitation as to the scope of use or functionality of embodiments of the invention described herein. Regardless, the system 1100 can implement and/or performing any of the functionality set forth herein. In the system 1100 there is a computer system 1112, which is operational with numerous other general purpose or special purpose computing system environments or configurations. Examples of well-known computing systems, environments, and/or configurations that may be suitable for use with the computer system 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 1112 may be described in the general context of computer system-executable instructions, such as program modules, being executed by a computer system. Generally, program modules may include routines, programs, objects, components, logic, data structures, and so on that perform tasks or implement abstract data types. The computer system 1112 may be practiced in distributed cloud computing environments where tasks are performed by remote processing devices that are linked through a communications network. In a distributed cloud computing environment, program modules may be in both local and remote computer system storage media including memory storage devices.

As shown in FIG. 11, the computer system 1112 in the system environment 1100 is shown in the form of a general-purpose computing device. The components of the computer system 1112 may include, but are not limited to, a set of one or more processors or processing units 1116, a system memory 1128, and a bus 1118 that couples various system components including the system memory 1128 to the processor 1116.

The bus 1118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 1112 typically includes a variety of computer system readable media. Such media may be any available media that is accessible by the computer system 1112, and it includes both volatile and non-volatile media, removable and non-removable media.

The system memory 1128 can include computer system readable media in the form of volatile memory, such as random-access memory (RAM) 1130 and/or a cache memory 1132. The computer system 1112 may further include other removable/non-removable, volatile/non-volatile computer system storage media. By way of example only, a storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1118 by one or more data media interfaces. As will be further depicted and described below, the system memory 1128 may include at least one program product having a set (e.g., at least one) of program modules 1142 that are configured to carry out the functions of embodiments of the invention.

A program/utility 1140, having the set (at least one) of program modules 1142, may be stored in the system memory 1128 by way of example, and not limitation, as well as an operating system, one or more application programs, other program modules, and program data. Each of the operating systems may have one or more application programs, other program modules, and program data or some combination thereof, and may include an implementation of a networking environment. The program modules 1142 generally carry out the functions and/or methodologies of embodiments of the invention as described herein.

The computer system 1112 may also communicate with a set of one or more external devices 1114 such as a keyboard, a pointing device, a display 1124, a tablet, a digital pen, etc. wherein these one or more devices enable a user to interact with the computer system 1112; and/or any devices (e.g., network card, modem, etc.) that enable the computer system 1112 to communicate with one or more other computing devices. Such communication can occur via Input/Output (I/O) interfaces 1122. These include wireless devices and other devices that may be connected to the computer system 1112, such as, a USB port, which may be used by a tablet device (not shown). Still yet, the computer system 1112 can communicate with one or more networks such as a local area network (LAN), a general wide area network (WAN), and/or a public network (e.g., the Internet) via a network adapter 1120. As depicted, a network adapter 1120 communicates with the other components of the computer system 1112 via the bus 1118. It should be understood that although not shown, other hardware and/or software components could be used in conjunction with the computer system 1112. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method that includes a processor and a local storage device accessible by the processor of providing free storage to a client on a blockchain platform comprising:
   generating a number of free storage markers targeted for the client by a governing entity;
   responsive to validating the client by the governing entity, transferring the number of free storage markers to the client wherein the free storage markers include a timestamp, a number of tokens, a client identification, an expiration, and a governing entity signature; and
   processing an allocation from the number of free storage markers received from the client by the governing entity for storage access.

2. The method of claim 1, wherein the allocation is for writing and the client writes a content to the blobbers or storage providers of the platform.

3. The method of claim 2, wherein the content is written to the allocation by the blobbers or the storages providers of the platform and the client reads the content.

4. The method of claim 1, wherein the blockchain platform creates at least one free storage pool.

5. The method of claim 4, wherein a free storage write pool is created for writing and a free storage read pool is created for reading and the free storage write pool is different from a write pool populated from purchased tokens and the free storage read pool is different from a read pool populated from the purchased tokens.

6. The method of claim 1, wherein the client writes a storage transaction using the allocation created from the number of free storage markers to request the storage transaction.

7. The method of claim 6, wherein a blockchain mining network accepts the storage transaction when the allocation is signed by the governing entity, the marker has not expired, a total number of tokens is the free storage pool has not been used up, and the client id in the marker matches an id of the client writing the transaction.

8. The method of claim 1, wherein an unused portion of the free storage markers are transferred to a free storage renewal after the expiration.

9. The method of claim 1, wherein a read authorization is provided by an owner and a client pays for reading utilizing the free storage markers.

10. An information handling system for providing free storage to a client on a blockchain platform comprising:
    one or more processors;
    a memory coupled to at least one of the processors;
    a network interface that connects the local device to one or more remote web sites; and
    a set of computer program instructions stored in the memory and executed by at least one of the processors in order to perform actions comprising:
    generating a number of free storage markers targeted for the client by a governing entity;
    responsive to validating the client by the governing entity, transferring the number of free storage markers to the client wherein the free storage markers include a timestamp, a number of tokens, a client identification, an expiration, and a governing entity signature; and
    processing an allocation from the number of free storage markers received from the client by the governing entity for storage access.

11. The information handling system of claim 10, wherein the allocation is for writing and the client writes a content to the blobbers or storage providers of the platform.

12. The information handling system of claim 11, wherein the content is written to the allocation by the blobbers or the storages providers of the platform and the client reads the content.

13. The information handling system of claim 10, wherein the blockchain platform creates at least one free storage pool.

14. The information handling system of claim 13, wherein a free storage write pool is created for writing and a free storage read pool is created for reading and the free storage write pool is different from a write pool populated from purchased tokens and the free storage read pool is different from a read pool populated from the purchased tokens.

15. A computer program for providing free storage to a client on a blockchain platform stored in a computer readable storage medium, comprising computer program code that, when executed by the computer program, performs actions comprising:
    generating a number of free storage markers targeted for the client by a governing entity;

responsive to validating the client by the governing entity, transferring the number of free storage markers to the client wherein the free storage markers include a timestamp, a number of tokens, a client identification, an expiration, and a governing entity signature; and processing an allocation from the number of free storage markers received from the client by the governing entity for storage access.

16. The computer program product of claim 15, wherein the client writes a storage transaction using the allocation created from the number of free storage markers to request the storage transaction.

17. The computer program product of claim 16, wherein the content is written to the allocation by the blobbers or the storages providers of the platform and the client reads the content.

18. The computer program product of claim 15, wherein the blockchain platform creates at least one free storage pool.

19. The computer program product of claim 18, wherein a free storage write pool is created for writing and a free storage read pool is created for reading and the free storage write pool is different from a write pool populated from purchased tokens and the free storage read pool is different from a read pool populated from the purchased tokens.

20. The computer program product of claim 15, wherein the client writes a storage transaction using the allocation created from the number of free storage markers to request the storage transaction.

* * * * *